United States Patent Office 3,556,829
Patented Jan. 19, 1971

3,556,829
CARBODIIMIDE MODIFIED CLAY
Stanley E. Gebura, Mount Lakes, N.J., assignor to Interpace Corporation, Parsippany, N.J.
No Drawing. Filed May 1, 1968, Ser. No. 725,927
Int. Cl. C09c 1/00, 3/00; C08k 1/02
U.S. Cl. 106—288
9 Claims

ABSTRACT OF THE DISCLOSURE

A process has been provided for modifying with an organic compound a high surface area siliceous substance. According to this process, the siliceous substance is reacted with a carbodiimide such as cyclohexylcarbodiimide. Products prepared by this process are within the scope of the invention as are the uses of these products for purposes as adjuvants in poly(ester) and oleaginous composition formulations.

---

This invention relates to a process for preparing siliceous substances by reacting carbodiimide with a surface of a siliceous substance. A product obtained by the practicing of the process is within the scope of the invention as are the uses of this product, such as in poly(ester), oleaginous, paint, poly(vinyl chloride), and alkyd compositions.

A major reason for modifying siliceous substances is the relative availability of these low cost materials, and, thus, the attendant economic advantages if these materials may be employed as adjuvants or substitutes for a more scarce or expensive material. Another major reason for modifying these siliceous substances is the extremely small particles which are useful for bodying various materials. These particles may be obtained by appropriately working up the naturally occurring siliceous substances by various processes well known to the art. Thus, if these small particles which possess larger surface area per unit of weight are admixed with various liquids, a pronounced bodying effect is obtained. Hence, for this purpose, properly modified clays are useful in fluids such as paints, greases, oils, grouting compositions, etc. Consequently, an important reason for seeking modification of siliceous surfaces is to obtain proper compatibility and dispersions of the siliceous material.

Another reason for modifying the surface of clays and siliceous substances to make these useful for the above purposes is the natural tendency of these surfaces to be hydrophilic and organophobic. Hence, to render these siliceous materials, e.g., clays, useful in materials derived from organic compounds, the objective is to make these hydrophobic and/or organophilic. Obviously, depending on the material to which these siliceous substances will be added, various modifications are possible and have been proposed. For example, if organic polar materials are involved, certain properties must be demonstrated by modified clay to show compatibility with the environment displaying the particular polarity.

The foregoing makes it clear that many expensive materials have been sought to be substituted in whole or in part by siliceous materials and that in the process, siliceous materials have been sought, which if modified, can substitute or replace the expensive material. Needless to say, a proper mating of a siliceous substance as adjuvant with another material involves a multitude of problems, many interrelated and most of these highly unpredictable.

More importantly though, in order to render each siliceous substance suitable as an adjuvant, many prerequisites have to be met. Hence, a number of criteria have to be satisfied before a proper combination of the material and its siliceous substance adjuvant can be found. It is for this reason that the finding of a proper combination of material and adjuvant has been and still is an empirical art with few, if any, guidelines. Consequently, predictable results in this field have eluded the prior art practitioner.

PRIOR ART

A number of processes have been disclosed in the prior art for modifying siliceous substances such as clays with compounds possessing amine or amide functions.

While the amine and amide function containing compounds are useful, these compounds depend on the formation of an organophilic clay surface by the adsorption or adduct formation of the amine or amide moieties.

Other related processes for making clay particles compatible with organic materials have depended on the coating in an aqueous slurry of the siliceous surface with a condensation product of formaldehyde and an urea or formaldehyde and a phenol or merely forming an adduct with carbamyl halides or ureas. No specific reaction has been proposed for these preceding reactants in respect to the interaction with clay surfaces. It appears that several mechanisms are involved. For formaldehyde condensates, adduct formation is a possibility; and it is probably based on the affinity of formaldehyde resins to the surface of clay in a manner analogous to the formation of wet-strength paper with these condensates. However, the second group of compounds, carbamyl halides, probably interact with clay surfaces through the halide as well as the carbamyl functions of the compound.

Despite the various processes and products which have been proposed, it is still impossible to predict what will be the behavior of clay when modified with an organic compound and added to an organic fluid, e.g., a mineral oil.

For this reason, by merely finding a modifier, it is still impossible to foretell what viscosity characteristics will be displayed by the modified material in oil or the magnitude thereof. For example, when added to an oleaginous fluid, some of the modified clays increase the viscosity while others decrease the viscosity in reference to the same but unmodified clay added to the fluid.

From the previous prior art processes and problems, it is apparent that many routes have been tried to obtain a properly modified clay surface. Despite the profusion of processes and approaches, it is still an art to find a proper modifier which achieves satisfactory results on basis of modifier utilizations, modifier depositions, surface properties of the thus modified products, etc.—products which may be employed in systems to which siliceous materials are generally added.

It has now been found that siliceous substances such as clays and silicas can be modified in an unexpectedly advantageous manner by reacting the same with a carbodiimide of the formula $$R-N=C=N-R'$$

wherein R and R' is an aliphatic, alicyclic, aromatic or alkaromatic moiety. R and R' may be the same or a different moiety. Of the above carbodiimides, those where R and R' are aliphatic, alicyclic hydrocarbon, and alkaromatic moieties of up to 10 carbon atoms each are preferred. Representative examples of the above carbodiimides are: dioctyl carbodiimide, dihexyl carbodiimide, ditetradecyl carbodiimide, bis tri-methyl silyl carbodiimide, dicyclohexyl carbodiimide, diphenyl carbodiimide, di-ortho-tolyl carbodiimide, bis(2,6-diethylphenyl)carbodiimide. Cyclohexylcarbodiimide is the preferred species. It is believed that the silanol group on the surface of the siliceous substances interact with the carbodiimide by formulation of isoureas and/or its tautomers.

SILICEOUS SUBSTANCES

Useful siliceous substances are clays such as kaolinite, attapulgite, montmorillonite, and the like, as well as natural and synthetic silica. Of the siliceous substances, kaolin clay is preferred.

"Kaolin clay" or "kaolin" describe several hydrated aluminosilicate minerals, generally of plate-like structure and comprising species: kaolinite, nacrite, halloysite, dikcite. Kaolinitic materials are described by the general formula $Al_2O_3 \cdot 2SiO_2 \cdot xH_2O$ in which $x$ is usually 2. The weight ratio of $SiO_2$ to $Al_2O_3$ is 1.18, and kaolin clays normally possess $SiO_2/Al_2O_3$ ratios from 1.0 to 1.5.

A representative kaolin clay is Hydrite 10 obtainable from Whittaker, Clark and Daniels, Inc., 100 Church Street, New York, N.Y. It is a hydrated aluminum silicate (kaolin), non-reactive towards either acids or alkalies. It is readily deflocculated by common dispersing agents, e.g., caseinates, polymerized phosphates, sodium silicate, etc. It is compatible with both aqueous and non-aqueous vehicles. This clay is of white color of a brightness of 88 (G.E. brightness).

Typical physical constants of Hydrite 10 are:

Physical properties
Tapped bulk:
  20 grams–500 times—35 cc.
  Apparent density—35.6 lbs./cu. ft.
Loose bulk:
  20 grams—89.1 cc.
  Apparent density—13.7 lbs./cu. ft.
Specific gravity:
  True density—21.66 lbs./gal.
  Bulking figure—.04617 gal./lbs.

Typical particle size distribution of Hydrite 10 is:

| Equivalent spherical diameter, microns: Under— | Cumulative, percent |
|---|---|
| 4 | 100 |
| 2 | 95 |
| 1 | 80 |
| 0.5 | 44 |
| 0.2 | 7 |

Chemical composition

| | |
|---|---|
| Silica ($SiO_2$) | 44.94 |
| Aluminum oxide ($Al_2O_3$) | 38.22 |
| Ferric oxide ($Fe_2O_3$) | 0.27 |
| Calcium oxide (CaO) | 0.06 |
| Magnesium oxide (MgO) | 0.28 |
| Titanium dioxide ($TiO_2$) | 1.75 |
| Potash ($K_2O$) | 0.04 |
| Soda ($Na_2O$) | 0.21 |
| Loss on ignition | 13.6 |
| Moisture (max.) | 1.0 |
| Free moisture | 0.52 |

Other suitable siliceous materials are the Glomax series of kaolin clays such as Glomax LL available from Georgia Kaolin Co. The properties of these series of clays are defined in its Bulletin TSB-5 (this bulletin also gives fairly typical particle size distribution curves for kaolin clays). Another kaolin clay suitable in the present process is "Ione" airfloated kaolin clay available from Interpace, Parsippany, New Jersey. Typical properties of the last are:

Physical properties

| Particle size, microns: | Percent |
|---|---|
| Minus 2 | 50–55 |
| Plus 5 | 20–25 |
| G. E. Brightness | 75–76 |

Chemical analysis

| | |
|---|---|
| Silica | 45.0–47.0 |
| Alumina | 37.5–39.0 |
| Iron oxide | 0.3–0.5 |
| Titanium dioxide | 1.5–2.0 |
| Ignition loss | 13.0–14.0 |

As it was mentioned before, both natural and synthetic silicas can be modified according to this invention. Of the natural silicas, MiSil A-15 and "Amorphous Silica 'O' Grade" are available from Illinois Mineral Company, Cairo, Illinois. Suitable synthetic silicas, i.e., pyrogenic and precipitated silicas, are freely available and are sold under names such as Cab-O-Sil, Arc Silica 70, Aerosil, Ludox, Hi-Sil, and the like. Representative properties of Amorphous Silica "O" Grade are as follows:

Physical properties

Oil absorption (spatula rub-out)—34 to 36.
Specific gravity—2.65.
Weight per solid gallon, lbs.—22.07.
Bulking value—0.04531.
Apparent density (Scott Volumeter)—27–29 lbs./cu. ft.
pH Value—6.6 to 7.0.
Moisture limit at 105° C.—0.25 of 1%.
Refractive Index—1.54 to 1.55.
Hardness (Moh's Scale)—6.5.
Specific resistance (ohms)—25,700.
Molecular weight—60.09.
Melting point—3100° F. (1722° C.).
Hegman gauge (fineness of grind)—5.5.
200 mesh screen (thru)—99.99%.
325 mesh screen (thru)—93.73%.
400 mesh screen (thru)—98.92%.
Av. part. size (Fisher sub sieve)—2.35.
Specific surface area, cm.$^2$/g.—9,635.

Particle size distribution

Micron diameter:
  40 below 95.50%
  20 below 82.00%
  15 below 73.00%
  10 below 61.00%
  7.5 below 58.00%
  5.0 below 46.00%

Amorphous A-15 Grade Silica MiSil has the following size distribution and physical properties:

Physical properties

Apparent density (Scott Volumeter)—22 to 24 lbs./cu. ft.
Hegman gauge (fineness of grind)—6.5 to 7.0.
200 mesh screen (thru)—100.00%.
325 mesh screen (thru)—100.00%.
400 mesh screen (thru)—99.99%.
Av. part. size (Fisher subsieve)—1.82.
Specific surface area, cm.$^2$/g.—12,440.

Particle size distribution

Micron diameter:
  40 below 100.00%
  20 below 100.00%
  15 below 99.00%
  10 below 96.00%
  7.5 below 87.00%

As can be appreciated, siliceous substances of various particle size distribution may be employed. The overall range of particle size for the various substances as a group may be from submicron to 100 microns. Obviously, the above siliceous substances are given merely by way of an example because the diverse, useful siliceous substances are well known to those skilled in the art.

For purposes of suitable comparisons on a relative as well as on an absolute scale the various properties of the novel, modified siliceous substances, Hydrite 10 may be used as a standard.

DESCRIPTION OF PROCESS

Before the siliceous substance is reacted with a carbodiimide, it is dried to remove superficial surface water which is accomplished preferably by drying at about 100–110° C.

An alternative drying procedure is to suspend the finely divided siliceous substance in the organic solvent to be used in the reaction and reflux the system to remove superficial water. This results in a through drying of the solvent and removes undesirable excess water from the clay. After this drying procedure, the carbodiimide is added and the total reaction mixture refluxed for a period which will depend upon the temperature, clay and added organic compound involved, but will generally be in the range of from 1 to 10 hours. Temperatures of 50° C. and up are suitable for the reaction. Higher temperatures provide a shorter reaction time, but it is preferred not to exceed temperatures at which decomposition of the clay, carbodiimide and/or product take place. Thus, the temperature of boiling benzene, toluene, or xylene, operating at atmospheric pressure and lower, i.e., 50° C., is satisfactory.

Hydrocarbon solvents are preferred. Included are the aromatic, alicyclic and aliphatic hydrocarbons, for example, benzene, toluene, xylene, cumene, cyclohexylbenzene, cyclohexane, dimethylpentane, octane, dodecane, naphthas boiling between 50° C. and 150° C., and the like. Choice of a suitable quantity of solvent is principally dependent upon ease of manipulation. From 1 to 5 parts by weight of solvent per weight of clay is usually sufficient.

If the clay is heated to dryness, after heating, it is cooled and then reacted with the carbodiimide which is dispersed in an appropriate vehicle or solvent. The latter is substantially free of water. Following this reaction, the modified clay or siliceous substance is recovered by filtration and drying below the temperature at which the modified product decomposes.

Based on practical considerations, the amount of carbodiimide addition is from 0.1% to 10%, generally from 0.25% to 2%, on weight of the siliceous material. More importantly, this addition is achieved with little, if any, loss of carbodiimide. It is an important advantage as the loss of expensive material is sought to be minimized as much as possible.

In order to describe the present invention so that it may be more clearly understood, the following examples are set forth in which all parts are expressed in parts by weight unless otherwise stated. The examples are set forth primarily for the purpose of illustration and any specific enumeration of detail contained therein should not be interpreted as a limitation on the concept of this invention.

Example 1

Dried Amorphous "O" Grade silica was dispersed in 60 ml. dried benzene and the dispersion was reacted with excess dicyclohexyl carbodiimide at reflux. After cooling, the silica was allowed to settle and the benzene was decanted. The silica was washed with benzene, extracted with boiling benzene, filtered and dried. Analysis showed that 0.49 g. dicyclohexyl carbodiimide had reacted per 100 g. silica. The product was organophilic when tested with a butanol-water mixture. The starting silica was hydrophilic.

Example 2

Following the procedure as described in Example 1, 150 g. MiSil A-15 silica was reacted in benzene with 3 g. dicyclohexyl carbodiimide. The Brookfield viscosity of the product dispersed in mineral oil was compared with the starting silica. Twenty percent by weight silica dispersions were prepared.

Silica:
  Dried A-15
    R.p.m. _____ 4
    C.p.s. _____ 3188
  Modified with dicyclohexyl carbodiimide
    R.p.m. _____ 4
    C.p.s. _____ 1312

Example 3

One hundred and fifty grams dried Hydrite 10 dispersed in dry benzene was reacted with 2 g. dicyclohexyl carbodiimide. The product dispersed in mineral oil readily. The dispersion containing 20% by weight of the modified clay had a Brookfield viscosity of 3575 cps. at 20 r.p.m. Dried, unmodified Hydrite 10 did not form a stable dispersion with mineral oil.

A typical oil which is employed for evaluating and comparing the modified clays is sold under the trade name "Nujol."

As mentioned before, the modified clay products are suitable for polyester dispersions as adjuvant therein.

The liquid unsaturated polyester resins employed in producing improved molding compositions of this invention are obtained by reacting together a dihydric alcohol and a dibasic acid, either of which contains a pair of double bonded carbon atoms. The unsaturated long chain polyester molecule is essentially linear and is capable of being cross-linked to form a thermosetting resin solid through the double bonds in the ester. A liquid unsaturated monomer, such as styrene, is employed as a cross-linking solvent, and an organic peroxide is usually employed to catalyze the cross-linking reaction. These unsaturated polyesters are characterized by thermosetting without evolution of water. Commercially available unsaturated polyester resins usually contain a mixture of unsaturated polyesters and unsaturated monomeric solvent.

Polyols used in the preparation of commerical polyesters include: ethylene glycol; propylene glycol; 1:3 butylene, 2:3 butylene and 1:4 butylene glycols; diethylene glycol and triethylene glycol.

Maleic anhydride and fumaric acid are the most frequently used unsaturated acids in the preparation of unsaturated polyester maleic acid is used to a lesser extent. Other suitable unsaturated acids are citraconic acid, mesaconic acid, itaconic acid and 3:6 endomethylene tetrahydro phthalic anhydride. Equimolal proportions of glycol and dibasic acid are usually used. The unsaturated acid is frequently modified with a saturated dibasic acid, usually phthalic acid or anhydride, sebacic acid and adipic acid, to improve the flexibility of the thermoset product. In some instances trihydric alcohols, such as glycerine or castor oil, or higher alcohols, such as pentaerythritol or sorbitol, are used to modify the product.

Styrene, diallylphthalate and triallyl cyanurate are the principal crosslinking agents.

As mentioned, the crosslinking reaction is catalyzed with a peroxide catalyst, usually benzoyl peroxide. Other catalysts are methyl ethyl ketone peroxide and methyl isobutyl ketone peroxide.

Accelerators, stabilizers, promotors and coloring agents may be incorporated in the polyester when desired, as well as auxiliary fillers such as fibrous asbestos, calcium carbonates, etc.

In the preparation of moldable polyester mixes employing the novel coated kaolin, the clay is added to the unsaturated liquid polyester resin in the same manner and with equipment usually employed for adding clay or other fillers to the resin.

The polyester dispersions or mixes compounded with the modified siliceous material are useful for forming structures and formed shapes with reinforcing materials, such as glass fibers, e.g., weather boards, car bodies, and boats. About 10% to 200% of clay may be compounded with the polyester; the amount is dependent on the desired end use for the polyester composition. About 10% to 50% is the usual range, but up to 100% is also used.

Flexural strength of the polyester filled structures with the novel clay adjuvant is determined according to ASTM D-790. Impact strength is determined according to ASTM D-256.

As an example illustrating the use of the novel siliceous substances, kaolin was modified with dicyclohexyl carbodiimide in accordance with the process as described above in Example 1 and formulated with a polyester resin at 40:60 ratio by weight of clay to resin, a dispersion was obtained which had a higher viscosity than an untreated clay similarly formulated. This composition is useful for grouting tiles.

Besides the above-demonstrated applications, the siliceous substances as modified according to this invention are also suitable for advantageous incorporation in poly(vinyl chloride) blends, paints, and alkyd base compositions. In this connection, the conventional testing procedures used in these arts for evaluating the efficacy of the additives are employed in reference to the herein described adjuvants.

What is claimed is:

1. A fine, particulate inorganic siliceous substance of clay or silica having a surface modified with a carbodiimide reaction product therewith in an amount from 0.1% to 10%, on basis of the weight of said dry siliceous substance, said carbodiimide precursor being dioctyl carbodiimide, dihexyl carbodiimide, ditetradecyl carbodiimide, bis tri-methyl silyl carbodiimide, dicyclohexyl carbodiimide, diphenyl carbodiimide, di-ortho-toyl carbodiimide, or bis-(2,6-diethylphenyl)carbodiimide.

2. A fine, particulate siliceous mineral substance according to claim 1, wherein the carbodiimide is dicylohexyl carbodiimide or bistrimethyl silyl carbodiimide.

3. A product according to claim 2 wherein the siliceous substance is kaolin clay.

4. A product according to claim 2 wherein the siliceous substance is natural or synthetic silica.

5. A fine, particulate inorganic siliceous substance of clay or silica having a surface modified with a carbodiimide reaction product therewith in an amount from 0.1% to 10%, on basis of the weight of said dry siliceous substance, said carbodiimide precursor being represented by the formula

R—N=C=N—R' wherein R and R' is an aliphatic, alicyclic, aromatic or alkaromatic moiety having of up to 10 carbon atoms in each moiety.

6. The method of forming a finely divided, organophilic particulate of inorganic siliceous substance of clay or silica, said method comprising the steps of: heating the siliceous substance to drive off superficial surface water therefrom; cooling said siliceous substance; adding a substantially water free solution of dicyclohexyl carbodiimide; reacting said dicyclohexyl carbodiimide with the surface of the particulate material while refluxing the solution; and recovering the particulate material with the reaction product on the surface thereof by filtering and drying the same.

7. The method according to claim 6 wherein the clay is kaolin, the temperature to which it is heated is in the range from 100° to 110° C. and the solvent is dried benzene.

8. The method of forming a finely divided organophilic particulate siliceous substance of clay or silica, said method comprising the steps of: adding to the particulate substance a solvent to remove superficial surface water of said siliceous particulate substance upon heating; heating to reflux said solvent; adding to the substance, dicyclohexyl carbodiimide; continuing refluxing until a reaction product is formed on the surface of said particulate substance; and recovering said particulate substance by filtration and drying.

9. The method according to claim 8 wherein the clay is kaolin, and the solvent is benzene.

References Cited

UNITED STATES PATENTS

| | | | |
|---|---|---|---|
| 3,290,165 | 12/1966 | Iannicelli | 106—308N |
| 3,298,849 | 1/1967 | Dohman | 106—308N |
| 3,300,326 | 1/1967 | Ferrigno | 106—308N |

TOBIAS E. LEVOW, Primary Examiner

H. M. S. SNEED, Assistant Examiner

U.S. Cl. X.R.

106—308, 309; 260—40, 41